United States Patent [19]
Miyamoto

[11] Patent Number: 6,005,559
[45] Date of Patent: Dec. 21, 1999

[54] DISPLAY APPARATUS WITH A POWER CONSERVING DISPLAY

[75] Inventor: Katsuhiro Miyamoto, Isehara, Japan

[73] Assignee: Canon Kabushiki Kaisha, Tokyo, Japan

[21] Appl. No.: 08/364,781

[22] Filed: Dec. 27, 1994

[30] Foreign Application Priority Data

Dec. 28, 1993 [JP] Japan .................................. 5-349218

[51] Int. Cl.⁶ ..................................................... G09G 5/00
[52] U.S. Cl. ........................ 345/212; 345/211; 345/213
[58] Field of Search ..................................... 345/211, 213, 345/212, 214, 204; 395/750, 750.03, 750.05, 750.06; 364/707

[56] References Cited

U.S. PATENT DOCUMENTS

| | | | |
|---|---|---|---|
| 3,941,989 | 3/1976 | McLaughlin et al. | 364/707 |
| 5,315,311 | 5/1994 | Honkala | 345/212 X |
| 5,335,168 | 8/1994 | Walker | 364/707 |
| 5,353,041 | 10/1994 | Miyamoto et al. | 345/97 |
| 5,375,245 | 12/1994 | Solhjell et al. | 395/750 |
| 5,389,952 | 2/1995 | Kikinis | 345/212 |
| 5,448,262 | 9/1995 | Lee et al. | 345/212 |
| 5,481,732 | 1/1996 | Shahbazi | 395/750 |

FOREIGN PATENT DOCUMENTS

| | | |
|---|---|---|
| 0211308 | 2/1987 | European Pat. Off. . |
| 0381021 | 8/1990 | European Pat. Off. . |
| 0419910 | 4/1991 | European Pat. Off. . |
| 0456012 | 11/1991 | European Pat. Off. . |
| 0494610 | 7/1992 | European Pat. Off. . |
| 0502744 | 9/1992 | European Pat. Off. . |
| 0525786 | 2/1993 | European Pat. Off. . |

Primary Examiner—Steven J. Saras
Assistant Examiner—Seth D. Vail
Attorney, Agent, or Firm—Fitzpatrick, Cella, Harper & Scinto

[57] ABSTRACT

A display apparatus includes a power supply to be stopped in a low-power consumption mode, a unit for displaying an image based on image data input from a computer or television, and a unit for outputting a first transfer signal for stopping the power supply based on a first control signal for controlling transfer to the low-power consumption mode, which is input from the computer or television. The display apparatus also includes a unit for outputting a second transfer signal for stopping the power supply based on the input image data, and a power supply controller for stopping the power supply based on the first and second transfer signals.

41 Claims, 3 Drawing Sheets

DISPLAY APPARATUS WITH A POWER CONSERVING DISPLAY

BACKGROUND OF THE INVENTION

1. Field of the Invention

The present invention relates to a display apparatus used for a computer terminal monitor, a camera view finder, a television receiver, a projector, etc. Particularly, the present invention relates to a display apparatus capable of controlling power supplied from a power source on the basis of a plurality of types of signals.

2. Related Background Art

Since there are demands for energy saving of office automation apparatus such as computers, terminal monitors thereof, etc., regulations on energy saving are established by some institutions. In accordance with the regulations on an energy-saving monitor, the energy-saving monitor must be set so that the power consumption of the monitor is decreased to 30 W or less a predetermined time after the operator of a computer stops using a keyboard.

Examples of conceivable means for satisfying the regulation item are the following means:

1. A computer device for supplying image signals is partially changed so as to superimpose, on a monitor synchronous signal, the information that a predetermined time has passed after the operator stops using the keyboard. The monitor decodes the information, and controls the power consumption of the monitor to force it to decrease on the basis of the information.
2. A computer device for supplying image signals is partially changed so as to change image data into predetermined data and output the data to the monitor side after the passage of a predetermined time after the operator stops using the keyboard. The monitor discriminates the image data, and, when predetermined image data is continuously sent for a predetermined time, controls the power consumption of the monitor itself to force it to decrease.
3. The monitor makes a decision as to whether or not the image data sent from a computer device for supplying image signals is changed, and, when the image data is not changed for a predetermined time, controls the power consumption of the monitor itself to force it to decrease.

However, a conventional low-power consumption mode uses only the above methods 1 or 2 for controlling the monitor to bring it into a low-power consumption mode when a computer or television requests the low-power consumption mode, not the above method 3 of transferring to the low-power consumption mode based on a decision by the monitor itself. This means that even when the monitor itself requests to transfer to the low-power consumption mode, it is impossible to transfer to the low-power consumption mode unless a request for the low-power consumption mode is given from the side of a computer or television. It is thus impossible to realize the function to transfer to the low-power consumption mode in as short of intervals as possible for increasing the life of a back light in the monitor.

In a monitor having a memory function, e.g., a ferroelectric liquid crystal panel display monitor, a plasma display monitor or the like, when input image data is not changed, display data does not disappear even if electric power supplied to the monitor is partially or completely decreased. If the image data is not changed, it is thus possible to realize the low-power consumption mode by cutting off the power supplied to the monitor. However, it was found to be necessary for improving the effect that not only a request from a computer or the like can be waited for, but also the normal mode can be transferred to the low-power consumption mode on the side of the monitor itself, as in method 3.

Although, in methods 1 and 2, a new function must be added to a computer or television system, even if the low-power consumption mode function is provided on the monitor side in an old type computer or television system, the system cannot comply with the function.

Method 3 produces the problem to be solved that when a cursor flickers or a time is displayed, even if the user does not push the keyboard, image data is always changed, thereby making it impossible to transfer to the low-power consumption mode.

SUMMARY OF THE INVENTION

In consideration of the above problems of prior art, an object of the present invention is to provide a display apparatus which is capable of transferring to the low-power consumption mode on the basis of a decision by the display apparatus itself.

Another object of the present invention is to provide means (means for releasing the low-power consumption mode) for returning to the normal mode from the low-power consumption mode on the basis of instructions from the user.

A further object of the present invention is to provide a display apparatus for displaying an image in a first mode for predetermined power consumption, and a second mode for lower power consumption than in the first mode. The display apparatus comprises a control circuit for transferring from the first mode to the second mode when receiving a first input signal, and transferring from the first mode to the second mode when detecting a change in input image data.

In order to achieve the objects, in accordance with an embodiment of the present invention, there is provided a display apparatus comprising a power supply (16, 17) to be stopped in the low-power consumption mode, display means (15 to 19) for displaying an image on the basis of the image data input from a computer or television set, and means (5) for outputting a first transfer signal for stopping the power supply on the basis of a first control signal for controlling transfer to the low-power consumption mode. The first transfer signal is input from the computer or television, also provided are means (6, 7; 8 to 10) for outputting a second transfer signal for stopping the power supply on the basis of the input image data, and power supply control means (11 to 14) for stopping the power supply on the basis of the first and second transfer signals. Reference numerals in parentheses each denote the corresponding elements of the apparatus shown in FIG. 2.

In the present invention, the components below can appropriately be selected and employed as optional means.

It is preferable to provide means for outputting a first start signal for starting the power supply on the basis of the first control signal, and means for outputting a second start signal for starting the power supply on the basis of the input image data. In this case, the power supply control means starts the power supply on the basis of the first and second start signals.

The power supply control means generally has timer means for adjusting the time taken from the receipt of the first or second transfer signal to the stoppage of the power supply.

The power supply control means preferably also has switching means for outputting a signal for releasing the low-power consumption mode. In this case, the power supply control means starts the power supply on the basis of this signal.

When there are a plurality of power supplies for driving the display means, which are respectively stopped by the first and second transfer signals, if the first and second transfer signals compete with each other, the power supply control means performs a logical operation of the signals based on predetermined logic, and selectively stops the plurality of power supplies on the basis of the results of the operation. Alternatively, the power supply control means selects a signal with higher priority based on predetermined logic and selectively stops the plurality of power supplies on the basis of the selected signal. In this case, it is preferred to provide means for changing the predetermined logic.

The means for outputting the second transfer signal has means for comparing the input image data with predetermined image data and outputting as a third transfer signal the second transfer signal, and means for outputting as a fourth transfer signal the second transfer signal on the basis of a change in the input image data.

The image display means has, for example, a liquid crystal panel and a back light for illuminating the panel. In this case, the power supply for driving the liquid crystal panel and the power supply for the back light which is actuated separately therefrom are stopped in the low-power consumption mode.

In the above-described construction, if the first control signal includes a signal for stopping the power supply to be stopped in the low-power consumption mode, when the first transfer signal is output, the power supply control means stops the power supply on the basis of the first transfer signal to transfer to the low-power consumption mode. When the second transfer signal is output on the basis of the input image signal, similarly, the power supply is stopped to transfer to the low-power consumption mode. Namely, transfer to the low-power consumption mode is preformed by decision by the display apparatus itself based on the input image data.

On the other hand, when the means for outputting the first and second start signals are provided, if the first control signal includes a signal for starting the power supply which was previously stopped, when the first start signal is output, the power supply control means starts the power supply on the basis of the first start signal to release the low-power consumption mode. When the second start signal for starting the power supply is output on the basis of the input image data, the power supply control means starts the power supply on the basis of the second start signal to release the low-power consumption mode. Namely, the low-power consumption mode is released by a decision of the display apparatus itself on the basis of the input image data.

DETAILED DESCRIPTION OF THE PREFERRED EMBODIMENTS

Figure 1:
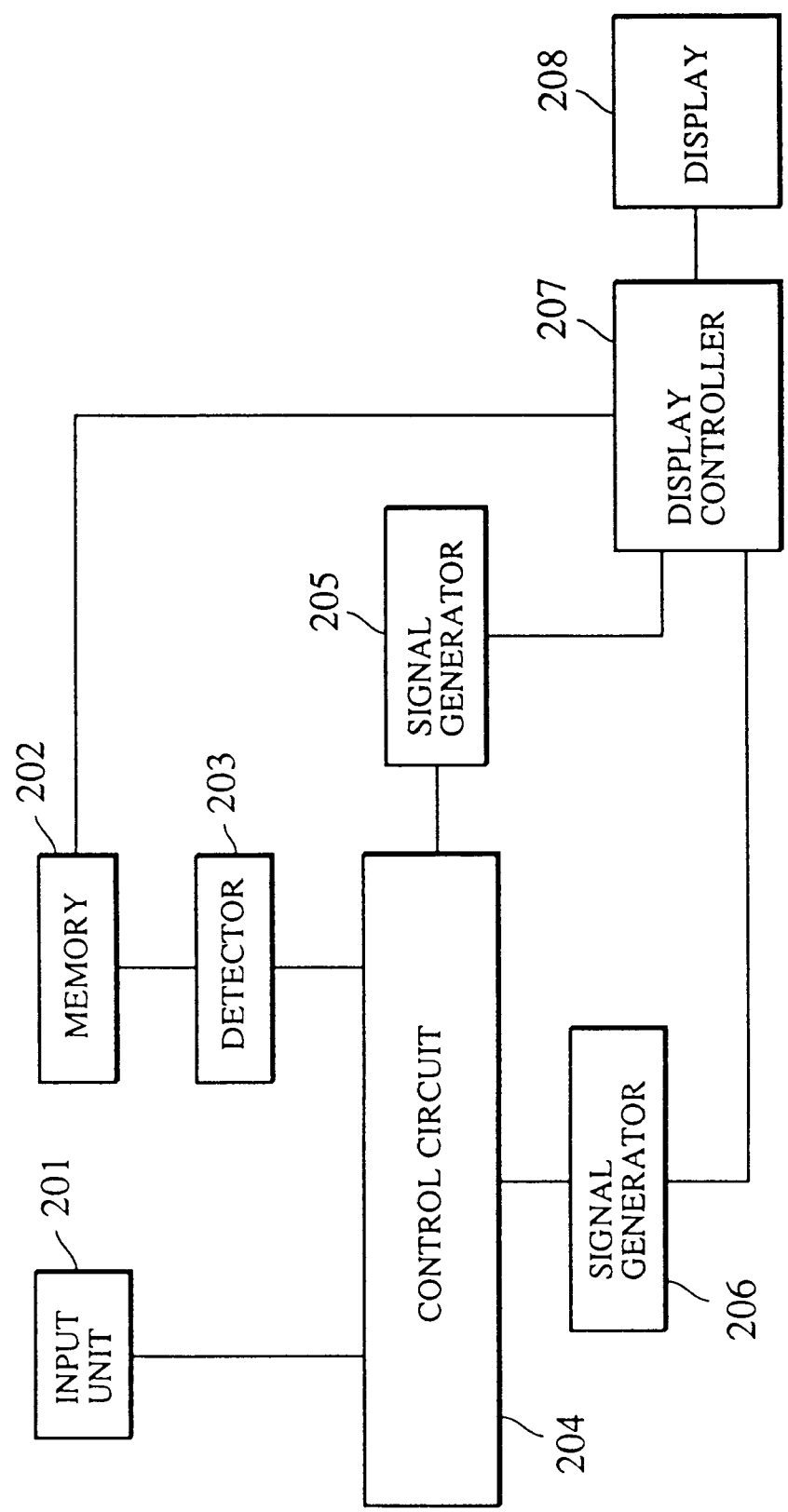
FIG. 1 is a block diagram illustrating a display apparatus in accordance with an embodiment of the present invention.

FIG. 1 is a block diagram illustrating a control system of a display apparatus in accordance with an embodiment of the present invention. In FIG. 1, reference numeral 201 denotes an input unit comprising a keyboard, a mouse, etc. Reference numeral 202 denotes an image memory for storing an image signal output from an image signal generator (e.g., an image scanner, a television tuner or the like), which is not shown in the drawing. Reference numeral 203 denotes a detector for detecting a change in the signal stored in the image memory. Reference numeral 204 denotes a control circuit for transmitting a signal to one of signal generators 205 and 206 when receiving a signal from one of the input unit 201 and the detector 203. Reference numerals 205 and 206 each denote the signal generator for generating a signal for switching display modes. Reference numeral 207 denotes a display controller for selecting one of a plurality of display modes and executing the selected mode. Reference numeral 208 denotes a display for displaying an image in accordance with the selected display mode. The display 208 has a power supply, display means such as a liquid crystal panel, etc.

The display controller 207 generates first and second transfer signals when receiving instructions to transfer to a second mode (low-power consumption mode) from a first mode from the signal generators 205 and 206. The first transfer signal is generated in response to the first control signal output from the input unit 201, and the second transfer signal is generated in response to the detection signal from the detector 203. The display controller 207 also switches the display modes when receiving the first and second transfer signals.

The display modes may be modes for different power consumptions, and power consumption is appropriately determined by limitations in an area where the apparatus is used, the type of information to be displayed, the size of the display, etc.

At least in the low-power consumption mode, one is selected from a method of decreasing the quantity of light of the back light, a method of turning off the back light, a method of decreasing the driving voltage, and a method of increasing the refresh scanning period, and is executed.

The low-power consumption mode is returned to the normal mode in response to the signal output from the input unit 201 or the detector 203. If required, mode changes are provided with priorities so as to add the function to return to the normal display mode when an image on the memory 202 is rewritten even if the signal for transferring to the low-power consumption mode is generated from the input unit 201.

Figure 2:
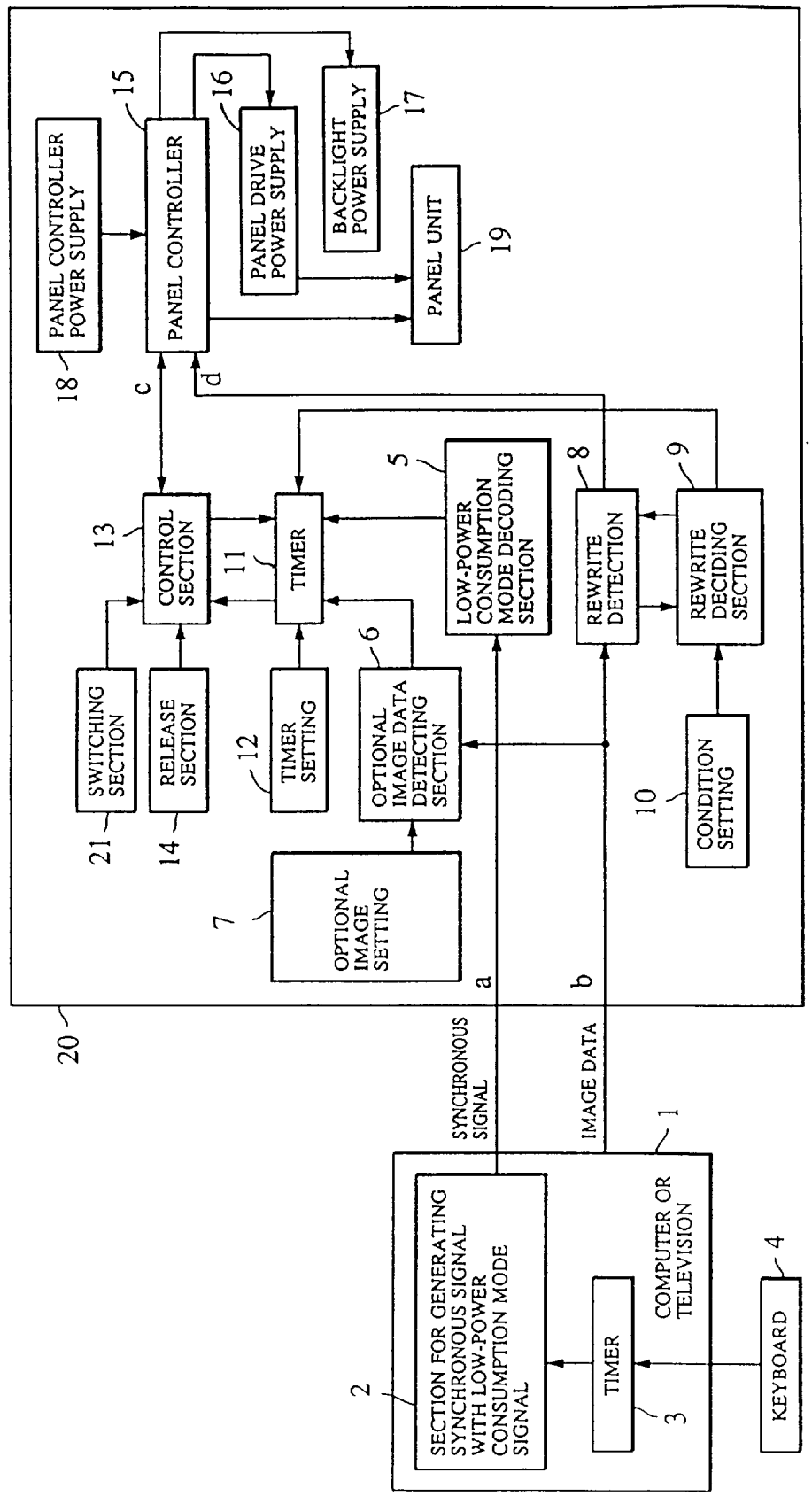
FIG. 2 is a block diagram illustrating a monitor system (display apparatus) in accordance with another embodiment of the present invention.
Figure 3:
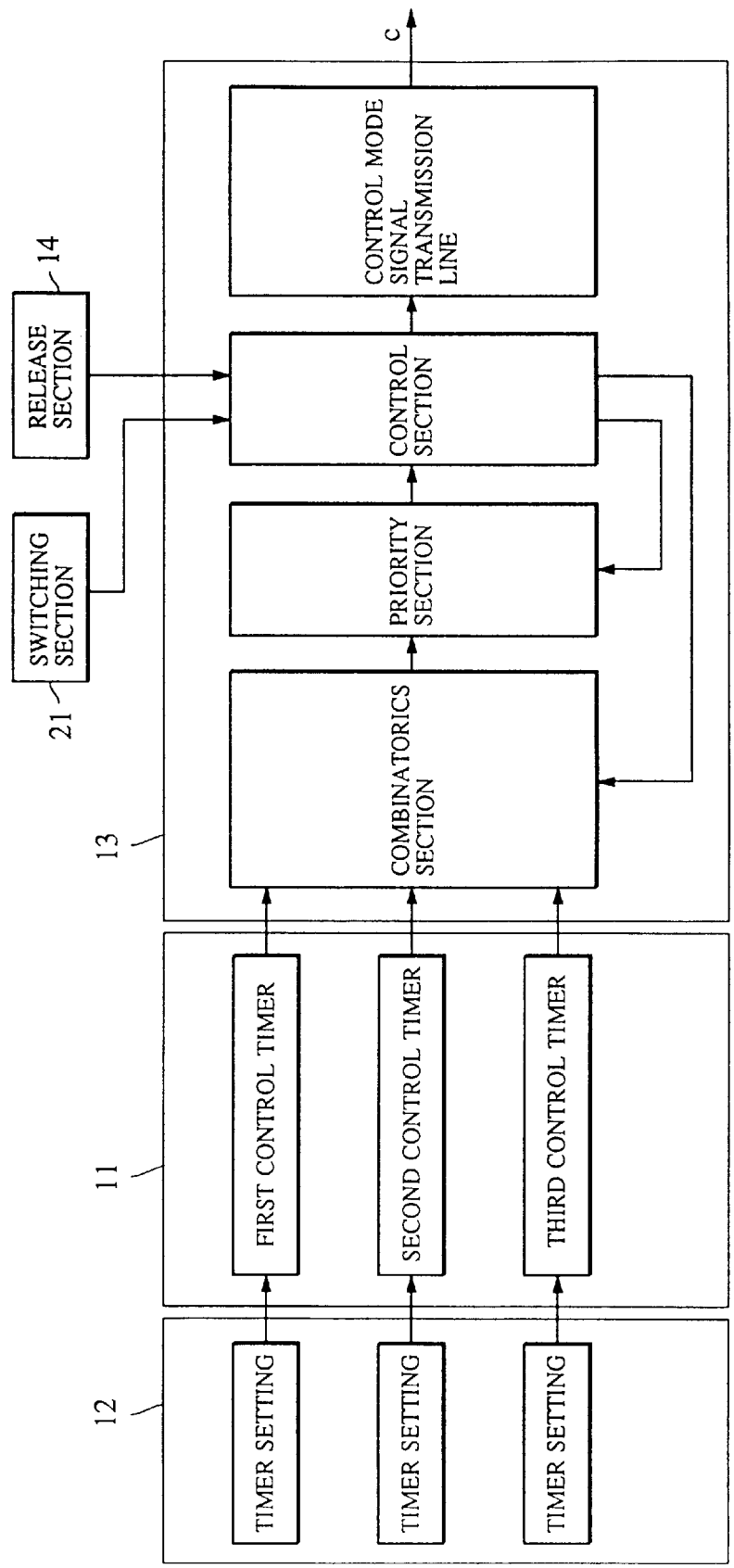
FIG. 3 is a block diagram illustrating a control section for controlling low-power consumption and the peripheral portion thereof of the monitor system shown in FIG. 2.

FIG. 2 is a block diagram illustrating a system comprising a display apparatus in accordance with another preferred embodiment of the present invention. In FIG. 2, reference numeral 20 denotes a monitor; reference numeral 1, a computer or television for supplying image data to the monitor; reference numeral 2, a synchronous signal generating section for superimposing, on a synchronous signal for the monitor 20, a signal for requesting the monitor 20 to transfer to the low-power consumption mode of the computer or television 1; reference numeral 3, a timer for determining a time required for executing the low-power consumption mode after the user stops input from a keyboard; reference numeral 4, the keyboard as an input device for the user; reference numeral 5, a decoding section for detecting the low-power consumption mode on the basis of the synchronous signal sent from the computer or television 1; reference numeral 7, an image data setting section for previously setting image data which indicates the low-power consumption mode; reference numeral 6, a detection section for detecting the low-power consumption mode by comparing the image data sent from the computer or television 1 with optional image data input from an image data setting section 7; reference numeral 8, a rewrite detecting section for detecting a change in the amount of image data sent from the computer or television 1; reference numeral 9, a rewrite deciding section for deciding as to whether the image data is rewritten or changed due to noise; reference numeral 10, a condition setting section for setting decision criteria for the rewrite deciding section 9; reference numeral 11, a timer group for receiving three low-power consumption mode transfer signals sent from the decoding section 5, the detection section 6 and the rewrite deciding section 9 and setting the time required for transferring to each of the modes; reference numeral 12, a timer setting section for setting the times of the timer group 11; reference numeral 13, a control section for receiving each of the low-power consumption transfer signals from the timer group 11 and sending each of the low-power consumption mode transfer signals to a panel controller 15; reference numeral 14, a release section for releasing the low-power consumption mode; reference numeral 15, the panel controller for receiving each of the low-power consumption mode transfer signals from the control section 13 and controlling each of power supplies of the monitor 20; reference numeral 16, a power supply for driving the panel; reference numeral 17, a power supply for a back light; reference numeral 18, a power supply for the panel controller 15; reference numeral 19, a panel unit (the panel, panel driving circuit, back light); and reference numeral 21, a switching section required for switching the control methods of the control section 13. FIG. 3 is a block diagram illustrating the control section 13, the timer setting section 12, the timer group 11, etc. As illustrated in FIG. 3, the timer setting section 12 and the timer group 11 have three timer setting sections and three timers connected thereto, respectively, in correspondence with the three low-power consumption mode transfer signals.

The procedure for transferring to the low-power consumption mode is described in detail below. The monitor 20 receives control signals (transfer signals) for transferring to one of three low-power consumption modes from the control section 13, and transmits each of the low-power consumption modes to the panel controller 15 on the basis of the control signals and information stored in the control section 13.

The procedure for generating the control signal (transfer signal) for the first low-power consumption mode is first described below. The timer 3 of the computer or television 1 measures the elapsed time since the user stops pushing the keyboard 4. When a predetermined time has elapsed, the synchronous signal generating section 2 superimposes the low-power consumption mode on the synchronous signal. The superimposing method may be a method of changing the pulse width of the synchronous signal in accordance with the low-power consumption modes, or a method of changing the level of the synchronous signal. When the monitor 20 receives the synchronous signal, the low-consumption mode decoding section 5 detects each of the low-power consumption modes from the pulse width or the level. The detection information is sent to the timer group 11, and then to the control section 13 after the elapse of the time set by the timer setting section 12.

The procedure for generating the control signal for the second low-power consumption mode is described below. The timer 3 of the computer or television 1 measures the elapsed time since the user stops pushing the keyboard 4, and converts the time into the image data predetermined by the monitor 20. In the monitor 20, the predetermined image data is set in the optional image data setting section 7. The optional image data detecting section 6 of the monitor 20 compares the image data sent from the computer or television 1 with the image data previously set in the image data setting section 7. When both image data are the same, the monitor recognizes the low-power consumption mode, and transmits recognition information to the timer group 11. The timer group 11 transmits the information to the control section 13 after the elapse of the time set by the timer setting section 12.

The first and second low-power consumption modes are released when the user pushes the keyboard 4 or the image data on the computer or television connected to the monitor 20 is changed by access thereto from the outside through a network. When a change in the image data is detected, the synchronous signal and the image data are changed to the normal mode in the computer or television 1. At the same time, the release signal is generated in each of the low-power consumption mode decoding section 5, and the optical image data detecting section 6, and transmitted to the control section 13 through the timer group 11. When the control section 13 receives the release signals, the release information is transmitted to the panel controller 15 to turn on each of the power supplies, which are previously turned off.

The procedure for generating the control signal for the third low-power consumption mode is described below. The rewrite detecting section 8 of the monitor 20 detects a change of the image data while monitoring the image data output from the computer or television 1 regardless of information output therefrom after the user stops pushing the keyboard 4. Namely, the level of the image data for the previous frame which is stored in a frame memory for one frame is compared with the level of the present image data at the same position, and a difference between the two levels is detected. Alternatively, a characteristic of the image, e.g., a rate of vertical or horizontal change of the image data, or the run length of the image data, may be compared with the characteristic of the previous frame data, and a difference may be detected. When the above difference is detected, data indicating the difference is transmitted to the rewrite deciding section 9. The rewrite deciding section 9 decides whether the transmitted image data difference is due to external noise or rewrite by the use. Although conditions for returning to the low-power consumption mode are established only when the image data difference is zero, when the image data transmitted from the computer or television 1 has analog values, and when noise is produced in the transmission system, a slight image data change is detected even if the image data is not changed by the user, thereby forming no control signal for transferring to the low-power consumption mode. In consideration of the noise, therefore, when the image data difference is smaller than the value set by the condition setting section 10, it is decided that the image data is not changed, and information of the low-power consumption mode is sent to the timer group 11. The timer group 11 transmits the information to the control section 13 after the elapse of the time set by the timer setting section 12.

The control section 13 observes the three low-power consumption mode signals on demand, and transmits the control signal for low-power consumption optimum for the panel unit 19 to the panel controller 15. Namely, the control section 13 has priorities of the three low-power consumption mode control signals, and simple combinational logic means, as illustrated in FIG. 3, so that the control signal for low-power consumption to be transmitted to the panel controller 15 can be changed. For example, with the priorities, when the control section 13 receives the first low-power consumption mode control signal after a signal for controlling the panel driving power supply 16 to turn it off by the third low-power consumption mode, the control signal is transmitted to the panel controller 15, or at the time of transmission of the signal, the low-power consumption control signal of the panel specified by the first low-power consumption mode control signal is transmitted. This takes preference of the request to execute the low-power consumption mode, which is given from the computer or television 1, and is thus effective for satisfying the standard specifications of the low-power consumption mode determined by the computer or television 1. The combinational logic means permits control in accordance with the levels of the specifications for low-power consumption of the computer or television 1 connected to the monitor 20. For example, when the monitor 20 is connected to the computer or television 1 which does not satisfy the specifications for superimposing the low-power consumption mode on the synchronous signal for generating the first low-power consumption mode control signal, AND of the first low-power consumption mode control signal and "0" prevents the control section 13 from receiving an incorrect control signal. For example, when it is desired to make all of the first, second and third low-power consumption modes effective, this can be realized by ORing all control signals.

The control section 13 transmits the required low-power consumption control signal to the panel controller 15 in accordance with the priorities and combinational logic. The priorities and combinational logic are controlled by a microcomputer and can be changed by the user from the outside through the switching section 21.

The control section 13 also has the function to release the low-power consumption mode by the monitor 20 itself. This is required when the normal mode is transferred to the low-power consumption mode by the third low-power consumption control signal with the back light 17 turned off, and when the user desires to recognize display contents even if the image data is not changed. The user can force the low-power consumption mode to be released by the release section 14 having a device such as a switch or the like provided on the monitor 20 to turn the back light on. When the rewrite deciding section 9 decides that the image data is rewritten by a cause of some kind, the decision signal is of course transmitted to the control signal 13, and to the panel controller 15 through the control line c shown in FIG. 2 for controlling the back light 17 to turn it on. The power supply 18 for the panel controller 15 required for release always remains turned off regardless of control by the control section 13.

The contents of the low-power consumption control signal include turning-off of the panel driving power supply, turning-off of the back light power supply, and turning-off of both power supplies. The low-power consumption control signal may be transmitted through the dedicated control signal line c, or superimposed on a portion of an image data bus c for transmitting the image data to the panel controller 15. Although, in FIG. 2, the image data is transmitted to the panel controller 15 from the rewrite detecting section 8, this is because a monitor having a memory such as a ferroelectric liquid crystal panel may receive only the image data in the rewritten portion. A monitor without memory may receive image data directly from the computer or television 1. Although the panel controller 15 can receive the control signal on demand, it has a control section for controlling the time of turning off the panel driving power supply 16. This is effective for a device such as a liquid crystal panel which produces deterioration in the panel when a DC voltage is applied thereto. When the panel controller 15 receives the control signal for turning off the panel driving power supply, the power supply is not immediately turned off, but turned off at the time no write voltage is present in the panel after one line is completely written. This prevents application of the DC voltage to the panel.

As described above, the present invention can transfer to the low-power consumption mode and release the low-power consumption mode based on the decision by the display apparatus itself. The computer or television which does not satisfy the low-power consumption specifications thus can comply with the low-power consumption specifications on the display apparatus side. On the other hand, since it is possible to transfer to the low-power consumption mode and release the low-power consumption mode by the control signal for controlling the transfer to the low-power consumption mode, which is output from the outside, a computer which satisfies the low-power consumption specifications has the effects in accordance with the specifications. It is also possible to increase the life of the apparatus by turning off the back light at short intervals according to the circumstances on the display apparatus side.

What is claimed is:

1. A display apparatus comprising:

display means for displaying an image, said display means operated in a first mode at predetermined power consumption, and in a second mode at a power consumption lower than said first mode; and a control circuit for controlling transfer from said first mode to said second mode in accordance with whether or not image data which is to be input in said display apparatus is predetermined image data, and controlling transfer from said second mode to said first mode when detecting a change in input image data.

2. A display apparatus comprising:

display means for displaying an image on the basis of input image data;

power supply means, capable of being stopped in a low-power consumption mode, for supplying power to said display means;

means for outputting a first transfer signal for stopping the power supply based on an input first control signal for controlling transfer to the low-power consumption mode;

means for outputting a second transfer signal for stopping the power supply based on the input image data, said second transfer signal outputting means outputting the second transfer signal in accordance with whether or not image data which is to be input in said display apparatus is predetermined image data; and power supply control means for stopping the power supply based on the first and second transfer signals.

3. A display apparatus comprising:

display means for displaying an image on the basis of input image data;

power supply means, capable of being stopped in a low-power consumption mode, for supplying power to said display means;

means for outputting a first transfer signal for stopping the power supply based on an input first control signal for controlling transfer to the low-power consumption mode;

means for outputting a second transfer signal for stopping the power supply based on the input image data, said second transfer signal outputting means outputting the second transfer signal in accordance with whether or not image data which is to be input in said display apparatus is predetermined image data;

power supply control means for stopping the power supply based on the first and second transfer signals;

first outputting means for outputting a first start signal for starting the power supply based on the first control signal; and second outputting means for outputting a second start signal for starting the power supply based on the input image data, said power supply control means starting the power supply based on the first and second start signals.

4. A display apparatus comprising:

display means for displaying an image on the basis of input image data;

power supply means, capable of being stopped in a low-power consumption mode, for supplying power to said display means;

means for ouputting a first transfer signal for stopping the power supply based on an input first control signal for controlling transfer to the low-power consumption mode;

means for outputting a second transfer signal for stopping the power supply based on the input image data, said second transfer signal outputting means outputting the second transfer signal in accordance with whether or not image data which is to be input in said display apparatus is predetermined image data; and power supply control means for stopping the power supply based on the first and second transfer signals, wherein said power supply control means includes timer means for adjusting the time from receipt of the first or second transfer signal to a stoppage of the power supply.

5. A display apparatus according to claim 2, further comprising switch means for outputting a signal for releasing the low-power consumption mode, said power supply control means starting the power supply based on the output signal.

6. A display apparatus comprising:

display means for displaying an image on the basis of input image data;

power supply means, capable of being stopped in a low-power consumption mode, for supplying power to said display means;

means for outputting a first transfer signal for stopping the power supply based on an input first control signal for controlling transfer to the low-power consumption mode;

means for outputting a second transfer signal for stopping the power supply based on the input image data, said second transfer signal outputting means outputting the second transfer signal in accordance with whether or not image data which is to be input in said display apparatus is predetermined image data; and power supply control means for stopping the power supply based on the first and second transfer signals, wherein there are a plurality of power supplies to be stopped in the low-power consumption mode, said power supplies are respectively stopped on the basis of the first and second transfer signals, so that when said first and second transfer signals compete with each other, said power supply control means performs a logical operation of said first and second transfer signals based on predetermined logic, and selectively stops said plurality of power supplies on the basis of the results of the logical operation.

7. A display apparatus comprising:

display means for displaying an image on the basis of input image data;

power supply means, capable of being stopped in a low-power consumption mode, for supplying power to said display means;

means for outputting a first transfer signal for stopping the power supply based on an input first control signal for controlling transfer to the low-power consumption mode;

means for outputting a second transfer signal for stopping the power supply based on the input image data; and power supply control means for stopping the power supply based on the first and second transfer signals;

switch means for outputting a signal for releasing the low-power consumption mode, said power supply control means starting the power supply based on the output signal; and means for changing predetermined logic and controlling said switch means based on the predetermined logic.

8. A display apparatus comprising:

display means for displaying an image on the basis of input image data;

power supply means, capable of being stopped in a low-power consumption mode, for supplying power to said display means;

means for outputting a first transfer signal for stopping the power supply based on an input first control signal for controlling transfer to the low-power consumption mode;

means for outputting a second transfer signal for stopping the power supply based on the input image data;

power supply control means for stopping the power supply based on the first and second transfer signals; and a plurality of power supplies for driving said display means, wherein said power supplies are respectively stopped on the basis of the first and second transfer signals, so that, when the first and second transfer signals compete with each other, said power supply control means selects a signal having a higher priority by predetermined logic, and selectively stops said plurality of power supplies based on the selected signal.

9. A display apparatus according to claim 8, further comprising means for changing said predetermined logic.

10. A display apparatus according to claim 2, wherein the first control signal is superimposed on a synchronous signal of the image data.

11. A display apparatus comprising:

display means for displaying an image on the basis of input image data;

power supply means, capable of being stopped in a low-power consumption mode, for supplying power to said display means, means for outputting a first transfer signal for stopping the power supply based on an input first control signal for controlling transfer to the low-power consumption mode;

means for outputting a second transfer signal for stopping the power supply based on the input image data; and power supply control means for stopping the power supply based on the first and second transfer signals, wherein said means for outputting the second transfer signal includes means for comparing the input image data with predetermined image data and outputting the second transfer signal as a third transfer signal, and means for outputting the second transfer signal as a fourth transfer signal based on a change in the input image data.

12. A display apparatus according to claim 6, wherein said image display means has a liquid crystal panel and a back light for illuminating said liquid crystal panel, and said power supply means for driving said display means include a power supply for driving said liquid crystal panel, and a power supply for said back light which is operated separately therefrom.

13. A display apparatus comprising:

display means for displaying an image on the basis of input image data;

power supply means, capable of being stopped in a low-power consumption mode, for supplying power to said display means;

means for outputting a first transfer signal for stopping the power supply based on an input first control signal for controlling transfer to the low-power consumption mode;

means for outputting a second transfer signal for stopping the power supply based on the input image data, said second transfer signal outputting means outputting the second transfer signal in accordance with whether or not image data which is to be input in said display apparatus is predetermined image data; and power supply control means for stopping the power supply based on the first and second transfer signals, wherein the first control signal is input at least one from a computer or television.

14. A display apparatus comprising:

display means for displaying an image, said display means operated in a first mode at predetermined power consumption, and in a second mode at a power consumption lower than said first mode; and control circuit means for controlling transfer from said first mode to said second mode in accordance with an input signal which is to be input in said display apparatus, and for controlling transfer from said first mode to said second mode in accordance with whether or not image data which is to be input in said display apparatus is predetermined image data.

15. A display apparatus according to claim 14, wherein the predetermined image data is image data for a previous frame which is stored in a frame memory.

16. A display apparatus according to claim 15, further comprising a deciding section for deciding that the image data for said previous frame and the image data to be input in said display apparatus are identical when the difference between the image data for said previous frame and the image data to be input in said display is smaller than predetermined difference.

17. A display apparatus according to claim 14, wherein the predetermined image is image data set in an image data setting section.

18. A display apparatus according to claim 14, further comprising a deciding section for deciding whether or not the image data to be input in said display apparatus is image data for a previous frame which is stored in a frame memory, and a detecting section for detecting whether or not the image data to be input in said display apparatus is image data set in an image data setting section.

19. A display apparatus according to claim 14, further comprising logic means for selecting either the control of the transfer from said first mode to said second mode in accordance with the input signal or the control of the transfer from said first mode to said second mode in accordance with the image data to be input in said display apparatus.

20. A display apparatus according to one of claims 14, 15, 17 and 19, wherein a first power supply which is turned off in said second mode is different from a second power supply for said control circuit.

21. A display apparatus according to one of claims 14, 15, 17 and 19, wherein a power supply for a back light is turned off in said second mode.

22. A display apparatus according to one of claims 14, 15, 17 and 19, wherein a driving power supply for a display panel is turned off in said second mode.

23. A control apparatus for controlling a display for displaying an image, said display operated in a first mode at predetermined power consumption, and in a second mode at a power consumption lower than said first mode, said control apparatus comprising control circuit means for controlling transfer from said first mode to said second mode in accordance with an input signal which is to be input in said control apparatus, and for controlling transfer from said first mode to said second mode in accordance with whether or not image data which is to be input in said control apparatus is predetermined image data.

24. A control apparatus according to claim 23, wherein the predetermined image data is image data for a previous frame which is stored in a frame memory.

25. A control apparatus according to claim 24, further comprising a deciding section for deciding that the image data for said previous frame and the image data to be input in said control apparatus are identical when the difference between the image data for said previous frame and the image data to be input in said control apparatus is smaller than predetermined difference.

26. A control apparatus according to claim 23, wherein the predetermined image data is image data set in an image data setting section.

27. A control apparatus according to claim 23, further comprising a deciding section for deciding whether or not the image data to be input in said control apparatus is image data for a previous frame which is stored in a frame memory, and a detecting section for detecting whether or not the image data to be input in said control apparatus is image data set in an image data setting section.

28. A control apparatus according to claim 23, further comprising logic means for selecting either the control of the transfer from said first mode to said second mode in accordance with the input signal or the control of the transfer from said first mode to said second mode in accordance with the image data to be input in said control apparatus.

29. A control apparatus according to one of claims 23, 24, 26 and 28, wherein said control circuit turns off a first power supply different from a second power supply for said control circuit in said second mode.

30. A control apparatus according to one of claims 23, 24, 26 and 28, wherein said control circuit turns off a power supply for a back light in said second mode.

31. A control apparatus according to one of claims 23, 24, 26 and 28, wherein said control circuit turns off a driving power supply for a display panel in said second mode.

32. A computer system comprising:

a display device for displaying an image, said display device operated in a first mode at predetermined power consumption, and in a second mode at a power consumption lower than said first mode;

a computer for generating image data; and control device means for controlling transfer from said first mode to said second mode in accordance with an input signal which is to be input in said display device from said computer, and for controlling transfer from said first mode to said second mode in accordance with whether or not image data which is to be input in said display device from said computer is predetermined image data.

33. A computer system according to claim 32, wherein the predetermined image data is image data for a previous frame which is stored in a frame memory.

34. A computer system according to claim 33, wherein said control device means comprises a deciding section for deciding that the image data for said previous frame and the image data to be input in said display device are identical when the difference between the image data for said previous frame and the image data to be input in said display device is smaller than predetermined difference.

35. A computer system according to claim 32, wherein the predetermined image data is image data set in an image data setting section.

36. A computer system according to claim 32, wherein said control device means comprises a deciding section for deciding whether or not the image data to be input in said display device is image data for a previous frame which is stored in a frame memory, and a detecting section for detecting whether or not the image data to be input in said display device is image data set in an image data setting section.

37. A computer system according to claim 32, wherein said control device means comprises logic means for selecting either the control of the transfer from said first mode to said second mode in accordance with the input signal or the control of the transfer from said first mode to said second mode in accordance with the image data to be input in said display device.

38. A computer system according to one of claims 32, 33, 35 and 37, wherein said display device comprises a first power supply which is turned off in said second mode and a second power supply for said control device which is different from said first power supply.

39. A computer system according to one of claims 32, 33, 35 and 37, wherein a power supply for a back light is turned off in said second mode.

40. A computer system according to one of claims 32, 33, 35 and 37, wherein a driving power supply for a display panel is turned off in said second mode.

41. A display apparatus comprising:

display means for displaying an image on the basis of input image data;

power supply means, capable of being stopped in a low-power consumption mode, for supplying power to said display means;

means for outputting a first transfer signal for stopping the power supply based on an input first control signal for controlling transfer to the low-power consumption mode;

means for outputting a second transfer signal for stopping the power supply based on the input image data, said second transfer signal outputting means outputting the second transfer signal in accordance with whether or not image data which is to be input in said display apparatus is predetermined image data; and power supply control means for stopping the power supply based on the first and second transfer signals, wherein said image display means means has a liquid crystal panel and a back light for illuminating said liquid crystal panel, and said power supply means for driving said display means include a power supply for driving said liquid crystal panel, and a power supply for said back light which is operated separately therefrom.

* * * * *

UNITED STATES PATENT AND TRADEMARK OFFICE
CERTIFICATE OF CORRECTION

PATENT NO. : 6,005,559  
DATED : December 21, 1999  
INVENTOR(S) : Katsuhiro Miyamoto Page 1 of 1

It is certified that error appears in the above-identified patent and that said Letters Patent is hereby corrected as shown below:

[45] Date of Patent should read -- *Dec. 21. 1999 --.

After [73] Assignee insert the following:

-- [*] Notice: This patent issued on a continued prosecution application filed under 37 CFR 1.53 (d), and is subject to the twenty year patent term provisions of 35 U.S.C. 154 (a) (2) . --

Sheet 3:  
FIG. 3, "COMBINATORICS" should read -- COMBINATIONAL --.

Column 2:  
Line 41, "television, also" should read -- television. Also --.

Column 14:  
Line 32, "means" (second occurrence) should be deleted.

Signed and Sealed this

Twenty-first Day of August, 2001

Attest:

*Attesting Officer*

NICHOLAS P. GODICI  
*Acting Director of the United States Patent and Trademark Office*